(12) United States Patent
Wang et al.

(10) Patent No.: US 12,504,591 B2
(45) Date of Patent: Dec. 23, 2025

(54) CO-PACKAGED STRUCTURE FOR OPTICS AND ELECTRICS

(71) Applicant: UNIMICRON TECHNOLOGY CORP., Taoyuan (TW)

(72) Inventors: Chin-Sheng Wang, Taoyuan (TW); Kai-Ming Yang, Taoyuan (TW); Chen-Hao Lin, Taoyuan (TW); Pu-Ju Lin, Taoyuan (TW); Cheng-Ta Ko, Taoyuan (TW)

(73) Assignee: UNIMICRON TECHNOLOGY CORP., Taoyuan (TW)

(*) Notice: Subject to any disclaimer, the term of this patent is extended or adjusted under 35 U.S.C. 154(b) by 341 days.

(21) Appl. No.: 18/213,142

(22) Filed: Jun. 22, 2023

(65) Prior Publication Data

US 2024/0377598 A1 Nov. 14, 2024

(30) Foreign Application Priority Data

May 12, 2023 (TW) ................ 112117617

(51) Int. Cl.
*H04B 10/00* (2013.01)
*G02B 6/42* (2006.01)

(52) U.S. Cl.
CPC .......... *G02B 6/4293* (2013.01); *G02B 6/424* (2013.01); *G02B 6/4244* (2013.01); *G02B 6/4259* (2013.01)

(58) Field of Classification Search
CPC .... G02B 6/4293; G02B 6/424; G02B 6/4244; G02B 6/4259; G02B 6/4257; G02B 6/4274; G02B 6/4267; G02B 6/4249; G02B 6/4246
See application file for complete search history.

(56) References Cited

U.S. PATENT DOCUMENTS

| | | | | |
|---|---|---|---|---|
| 9,645,316 | B1* | 5/2017 | Hasharoni | G02B 6/32 |
| 2008/0043796 | A1* | 2/2008 | Jikutani | G02B 6/4202 359/584 |
| 2012/0120978 | A1* | 5/2012 | Budd | G02B 6/4269 257/E31.127 |
| 2012/0326290 | A1* | 12/2012 | Andry | G02B 6/428 257/680 |
| 2014/0161396 | A1* | 6/2014 | Feng | G02B 6/423 385/83 |
| 2016/0226591 | A1* | 8/2016 | Arvelo | H01S 5/423 |
| 2018/0052281 | A1 | 2/2018 | Kuo et al. | |
| 2020/0158967 | A1* | 5/2020 | Winzer | G02B 6/4214 |
| 2021/0364717 | A1* | 11/2021 | Li | G02B 6/3853 |

(Continued)

OTHER PUBLICATIONS

Papatryfonos et al., "Co-Package Technology Platform for Low-Power and Low-Cost Data Centers" Jun. 30, 2021.

*Primary Examiner* — Agustin Bello
(74) *Attorney, Agent, or Firm* — Maschoff Brennan

(57) ABSTRACT

A co-packaged structure for optics and electrics includes a substrate, an optical module and an electrical connection layer. The optical module includes a carrier and an optical transceiver unit. The carrier is mounted on the substrate. The optical module is mounted on the carrier. The electrical connection layer is mounted on the substrate, and the carrier is electrically connected with a circuitry on the substrate through the electrical connection layer. A plurality of fiber accommodation through hole are formed on the substrate and correspond to the optical transceiver unit.

13 Claims, 5 Drawing Sheets

(56) References Cited

U.S. PATENT DOCUMENTS

| | | | |
|---|---|---|---|
| 2022/0291461 A1* | 9/2022 | Elsinger | G02B 6/12004 |
| 2022/0404566 A1* | 12/2022 | Giles | G02B 6/4227 |
| 2023/0375793 A1* | 11/2023 | Winzer | G02B 6/428 |
| 2024/0036254 A1* | 2/2024 | Winzer | G02B 6/12014 |
| 2024/0241333 A1* | 7/2024 | Pezeshki | G02B 6/43 |
| 2024/0377598 A1* | 11/2024 | Wang | G02B 6/424 |

* cited by examiner

CO-PACKAGED STRUCTURE FOR OPTICS AND ELECTRICS

This application claims priority under 35 U.S.C. § 119(a) on Patent Application No(s). 112117617 filed in Taiwan, R.O.C. on May 12, 2023, the entire contents of which are hereby incorporated by reference.

BACKGROUND

1. Technical Field

The present disclosure relates to packaging for optoelectronic communication components, more particularly to a packaging structure which integrates optics and electrics in a manner of co-packaged optics (CPO).

2. Related Art

With the development of 5G and 6G network bringing the advantages of increased transmission rate, the traditional pluggable optical modules are becoming difficult to meet the requirement of high-speed communication. In order to build more data centers, many equipment manufacturers have developed and introduced CPO packaging in recent years. In CPO packaging, the optical module is mounted on a board having application specific integrated circuit (ASIC) for switch, which is helpful to increase the density of the optical engines and reduce signal transmission distance by removing additional wiring for connecting the board with the optical module, thus reducing power consumption and signal latency.

As to a conventional CPO, a hollow is formed in a region of the circuit board corresponding to the optical module, and one or more fiver arrays containing optical fibers are mounted in the hollow to implement the transmission of optical signals between the optical engine and an external communication device. Since additional soldering process is required for mounting the optical arrays, and there are material differences between the optical arrays and the circuit board, the thermal expansion of the substrate causes the optical arrays to be squeezed, which resulting in worse optical coupling efficiency, and such problem is needed to be solved.

SUMMARY

According to one embodiment of the present disclosure, a co-packaged structure for optics and electrics includes a substrate, an optical module and an electrical connection layer. The optical module includes a carrier and an optical transceiver unit. The carrier is mounted on the substrate, and the optical transceiver unit is mounted on the carrier. The electrical connection layer is mounted on the substrate. The carrier is electrically connected with a circuitry on the substrate through the electrical connection layer. A plurality of fiber accommodation through holes corresponding to the optical transceiver unit are formed in the substrate.

According to one embodiment of the present disclosure, the optical transceiver unit may be provided between the carrier and the fiber accommodation through holes.

According to one embodiment of the present disclosure, the substrate may include alkali-free glass.

According to one embodiment of the present disclosure, at least part of the electrical connection layer may be provided between the substrate and the carrier.

According to one embodiment of the present disclosure, the optical transceiver unit may include an optical transmitter engine and an optical receiver engine corresponding to the fiber accommodation through holes.

According to one embodiment of the present disclosure, a thickness of the substrate may be from 50 μm to 300 μm, and a diameter of each fiber accommodation through hole may be is from 80 μm to 100 μm.

According to one embodiment of the present disclosure, a thermal expansion coefficient of the substrate may be from 3 ppm/° C. to 10 ppm/° C.

According to one embodiment of the present disclosure, the co-packaged structure for optics and electrics may include a vapor chamber in thermal contact with the substrate.

According to one embodiment of the present disclosure, the optical module and the vapor chamber may be provided at opposite sides of the substrate, respectively.

According to one embodiment of the present disclosure, the fiber accommodation through holes may be formed by removing part of the substrate.

According to one embodiment of the present disclosure, a co-packaged structure for optics and electrics includes a substrate, an optical module and an electrical connection layer. The optical module includes a carrier and an optical transceiver unit. The carrier is mounted on the substrate, and the optical transceiver unit is mounted on the carrier. The electrical connection layer is mounted on the substrate. The carrier is electrically connected with a circuitry on the substrate through the electrical connection layer. The substrate includes alkali-free glass, and a thermal expansion coefficient of the substrate is from 3 ppm/° C. to 10 ppm/° C.

According to one embodiment of the present disclosure, the optical transceiver unit may be provided between the carrier and the plurality of fiber accommodation through holes.

According to one embodiment of the present disclosure, at least part of the electrical connection layer may be provided between the substrate and the carrier.

According to one embodiment of the present disclosure, the co-packaged structure may include a plurality of optical fibers. The substrate may include a light transmittable portion corresponding to the optical module, and the optical fibers are disposed corresponding to the light transmittable portion.

According to one embodiment of the present disclosure, the optical fibers may be configured to transmit laser light.

It is to be understood that both the foregoing general description and the following detailed description are by examples, and are intended to provide further explanation of the disclosure as claimed.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

The terms such as "formed", "bonded", "attached", "mounted" and "configured" may be used below to describe the positional relationship between multiple layers, structures or members. However, unless otherwise expressly stated, these terms may cover implementations in which said layers, structures or members are in direct contact with each other, or one or more intermediates or other layers, structures, members may exist between said layers, structures or members.

Figure 1:
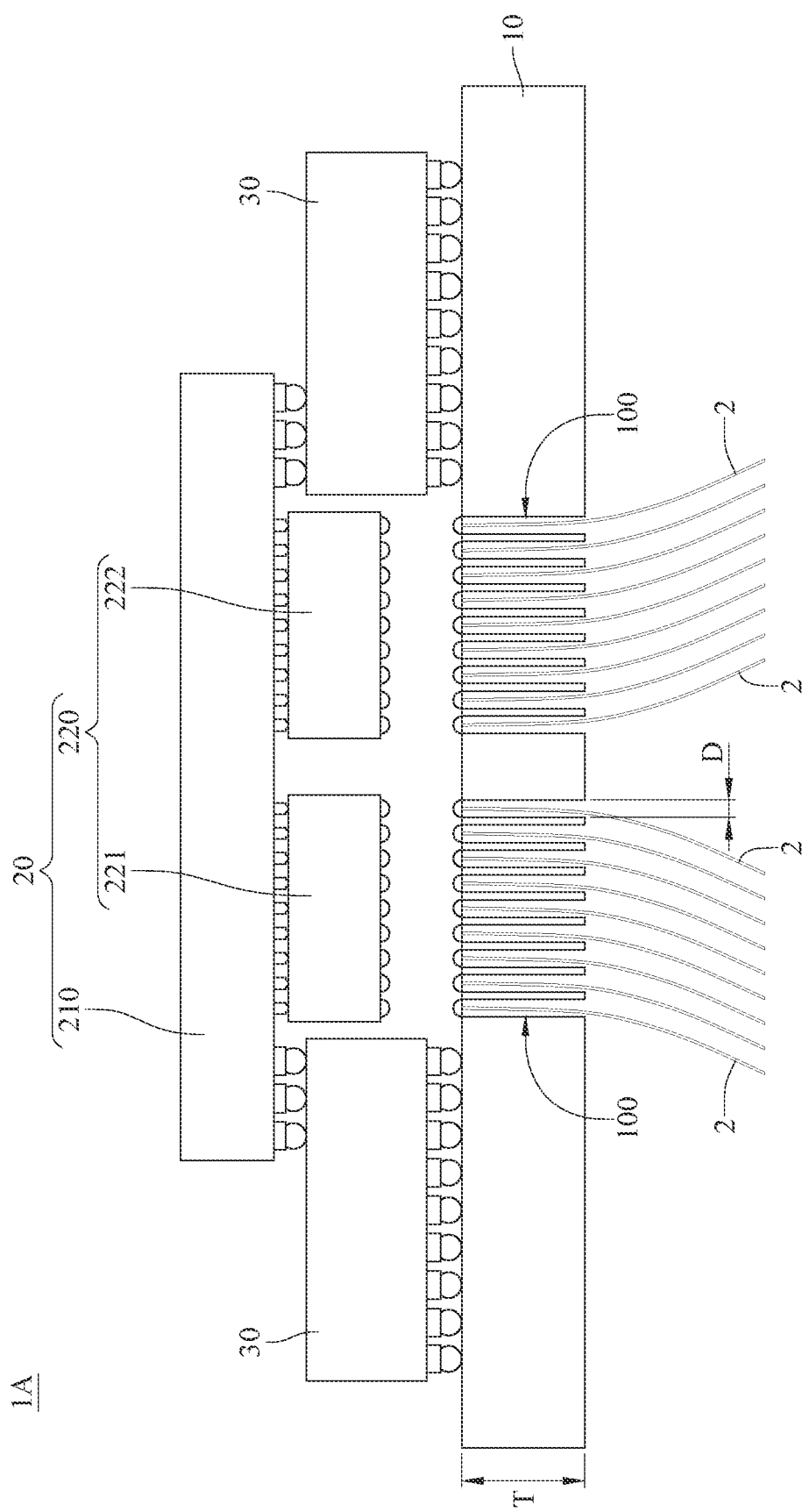
FIG. 1 is a schematic view of a co-packaged structure for optics and electrics according to a first embodiment of the present disclosure.

Please refer to FIG. 1 which is a schematic view of a co-packaged structure for optics and electrics according to a first embodiment of the present disclosure. In this embodiment, a co-packaged structure 1A for optics and electrics a substrate 10 and an optical module 20.

The optical module 20 includes a carrier 210 and an optical transceiver unit 220. The carrier 210 is mounted on the substrate 10, the optical transceiver unit 220 is mounted on the carrier 210, and the optical transceiver unit 220 is located between the substrate 10 and the carrier 210. In detail, in this embodiment or some other embodiments, the co-packaged structure 1A may include one or more electrical connection layers 30 mounted on the substrate 10, and at least part of the electrical connection layer 30 is located between the substrate 10 and the carrier 210. The carrier 210 is mounted on the substrate 10 by the electrical connection layer 30 and is electrically connected with a circuitry (not shown in the drawings) on the substrate 10 through the electrical connection layer 30. Said circuitry on the substrate 10 may be metal wiring inside the substrate 10 or on the surface thereof.

In this embodiment or some other embodiments, the substrate 10 may include transparent material. Further, the substrate 10 may include alkali-free glass. Further, the substrate 10 may be monolithic and may be an alkali-free glass board with circuitry formed thereon. Moreover, a thermal expansion coefficient of the substrate 10 may be from 3 ppm/° C. to 10 ppm/° C. Moreover, a thickness T of the substrate 10 may be from 50 μm to 300 μm. The thermal expansion coefficient of the substrate 10 may refer to its thermal expansion coefficient in any dimension over the range of room temperature to transition temperature (25° C. to 400° C.). Further, the thermal expansion coefficient of the substrate 10 may refer to its thermal expansion coefficient in the thickness direction (i.e., the vertical direction in FIG. 1).

In this embodiment or some other embodiments, the carrier 210 may be a chip operated with the optical transceiver unit 220, more specifically, a chiplet integrating multiple functions, and said functions may contain transimpedance amplifiers (TIA), drivers and clock and data recovery (CDR). The optical transceiver unit 220 may be at least one of an optical transmitter engine and an optical receiver engine. The optical transmitter engine may be an emitter or an assembly of an emitter and other optical components, and the optical receiver engine may be a receiver or an assembly of a receiver and other optical components. Herein, the emitter may be, for example but not limited to, a laser diode, the light receiver may be, for example but not limited to, an optoelectronic diode, and the optical components may be, for example but not limited to, lenses, color filters and/or optical isolators. Further, as shown in FIG. 1, the optical transceiver unit 220 may include one light transmitter engine 221 and one optical receiver engine 222.

The substrate 10 forms a plurality of fiber accommodation through holes 100 corresponding to the optical transceiver unit 220, and the optical transmitter engine 221 as well as the optical receiver engine 222 of the optical transceiver unit 220 correspond to these fiber accommodation through holes 100. In this embodiment and some other embodiments, the fiber accommodation through holes 100 may be formed by removing part of the substrate 10. Specifically, the fiber accommodation through holes 100 may be formed by removing part of the substrate 10 using dry etching or micro-drilling techniques. In addition, a diameter D of each of the fiber accommodation through holes 100 may be from 80 μm to 100 μm.

The co-packaged structure 1A may include a plurality of optical fibers 2 accommodated in the fiber accommodation through holes 100, respectively. The optical fibers 2 corresponding to the optical transmitter engine 221 may transmit the optical signals generated by the optical transmitter engine 221 to an external communication device (not shown in the drawings). The optical fibers 2 corresponding to the optical receiver engine 222 may allow the optical signals transmitted from the external communication device to be received by the optical receiver engine 222.

According to the present disclosure, the substrate 10 of the co-packaged structure 1A is made of glass material so as to facilitate transmission loss reduction. The glass substrate enjoys the characteristics of chemical corrosion resistance, scratch resistance and low thermal deformation which can effectively protect the optical fibers 2. Also, compared to the conventional CPO that forms a hollow in the circuit board and mount fiber arrays in this hollow, the formation of the fiber accommodation through holes 100 in the substrate 10 can prevent difference in thermal expansion due to different materials, such that the thermally expanded substrate 10 will not overly squeeze or even bend the optical fibers 2, and thus it is helpful to maintain high optical coupling efficiency even after a long operation of the optical module 20. Furthermore, the formation of the fiber accommodation through holes 100 in the substrate 10 also eliminates the requirement of soldering process for bonding the fiber arrays to the circuit board in the conventional CPO, thereby helpful to simplify the manufacturing process.

Figure 2:
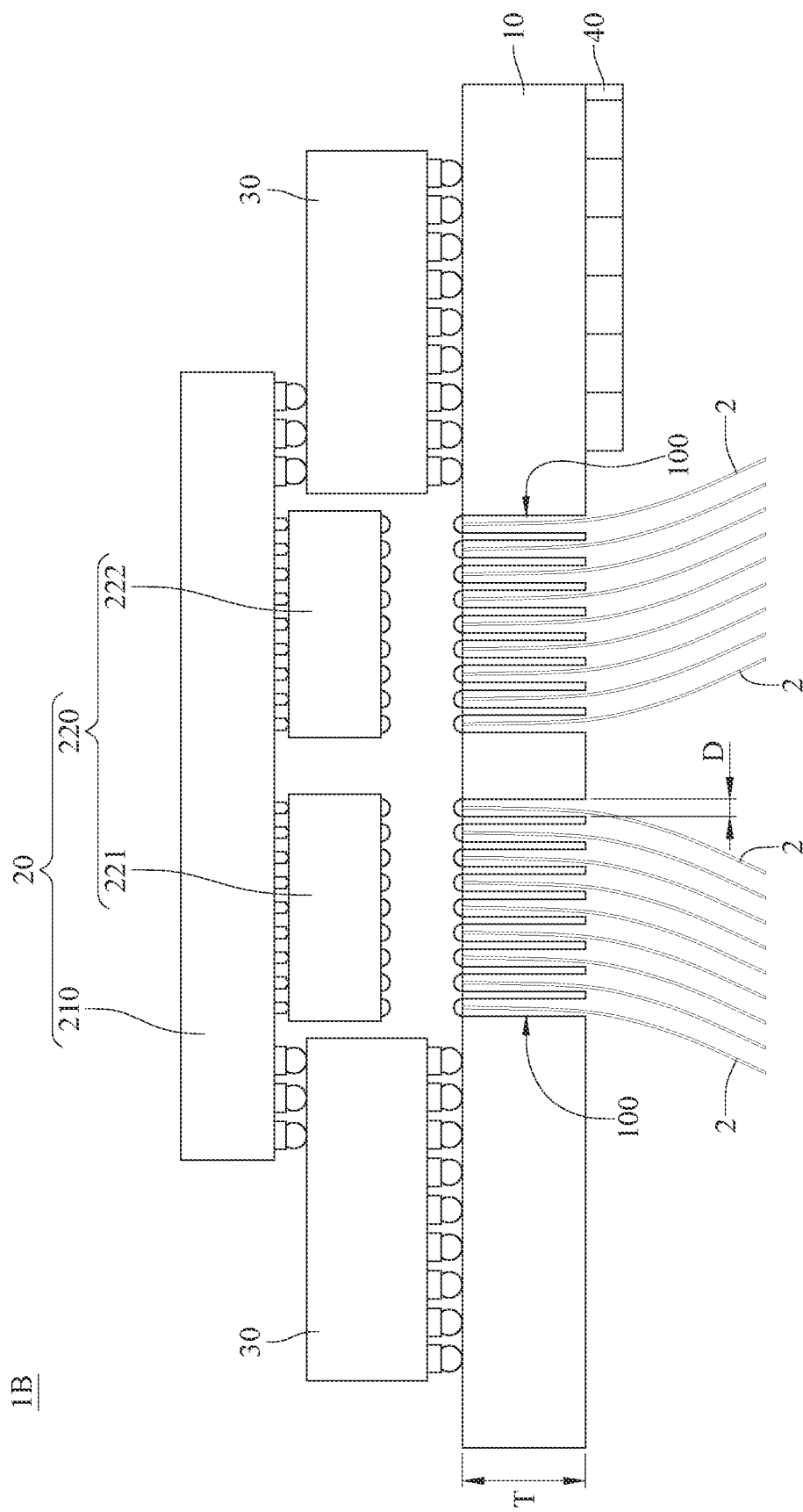
FIG. 2 is a schematic view of a co-packaged structure for optics and electrics according to a second embodiment of the present disclosure.

FIG. 2 is a schematic view of a co-packaged structure for optics and electrics according to a second embodiment of the present disclosure. In this embodiment, a co-packaged structure 1B is similar to the co-packaged structure 1A disclosed in FIG. 1, and a primary difference is that the co-packaged structure 1B further includes a vapor chamber 40 in thermal contact with the substrate 10. The optical module 20 and the vapor chamber 40 may be located at opposite sides of the substrate 10, respectively. More specifically, the vapor chamber 40 may be directly attached to a bottom surface of the substrate 10. The vapor chamber 40 in thermal contact with the substrate 10 can be helpful to further prevent the optical fibers 2 from being squeezed or even bent by the thermally expanded substrate 10.

Figure 3:
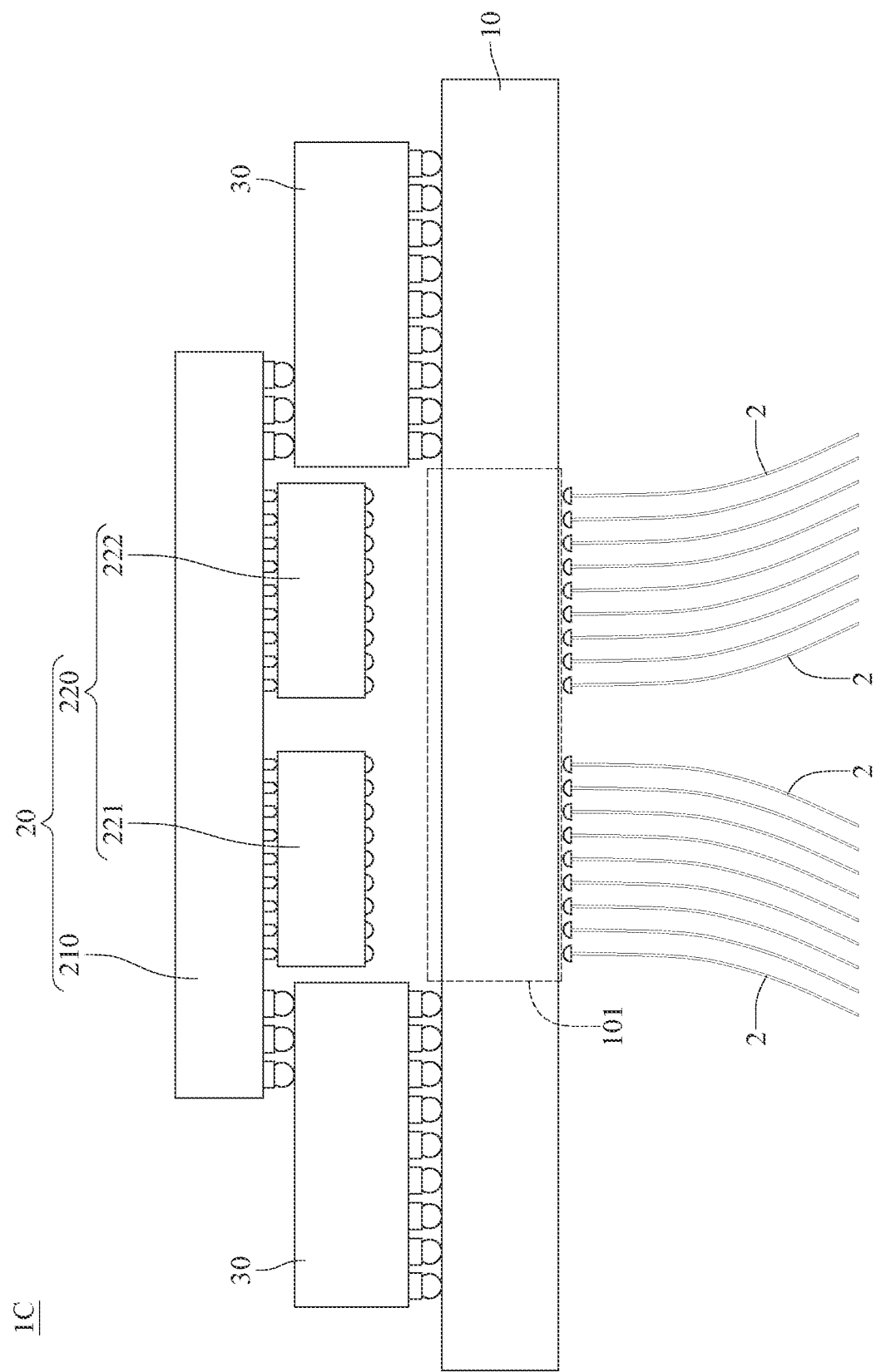
FIG. 3 is a schematic view of a co-packaged structure for optics and electrics according to a third embodiment of the present disclosure.

FIG. 3 is a schematic view of a co-packaged structure for optics and electrics according to a third embodiment of the present disclosure. In this embodiment, a co-packaged structure 1C is similar to the co-packaged structure 1A disclosed in FIG. 1, and a primary difference is that the co-packaged structure 1C further includes a substrate 10 without fiber accommodation through holes.

The substrate 10 of the co-packaged structure 1C includes a light transmittable portion 101 corresponding to the optical transceiver unit 220 of the optical module 20, and the optical fibers 2 are disposed corresponding to the light transmittable portion 101. More specifically, the optical module 20 and the optical fibers 2 may be located at opposite sides of the light transmittable portion 101, respectively. In this embodiment, in order to reduce scattering or diffraction when the optical signals pass through the substrate 10, the optical signals transmitted by the optical fibers 2 may be laser light, more preferably laser light with single wavelength.

In this embodiment, the substrate 10 may be monolithic and may be an alkali-free glass board with circuitry formed thereon. Or, at least the light transmittable portion 101 is made of alkali-free glass.

Figure 4:
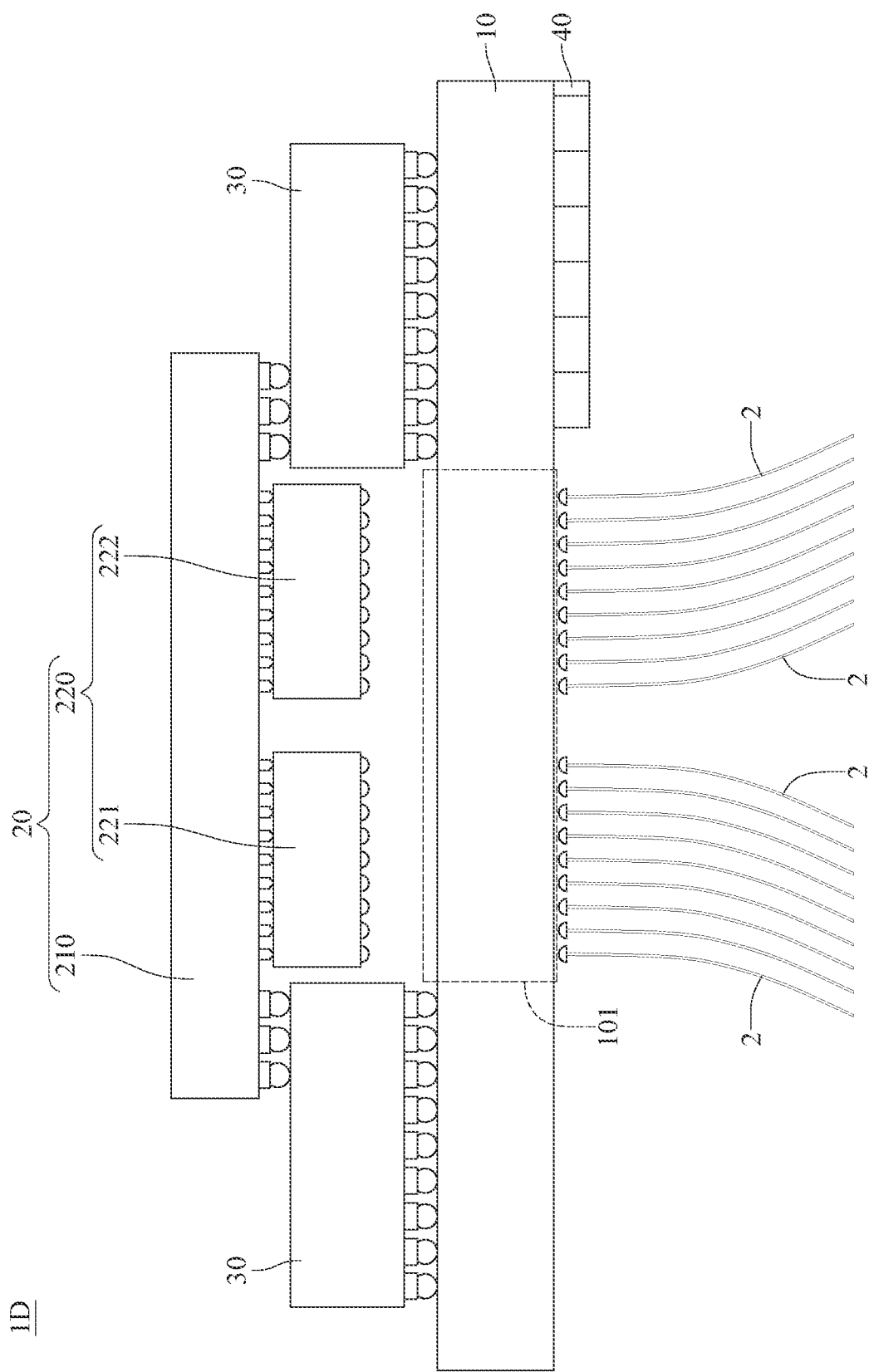
FIG. 4 is a schematic view of a co-packaged structure for optics and electrics according to a fourth embodiment of the present disclosure.

FIG. 4 is a schematic view of a co-packaged structure for optics and electrics according to a fourth embodiment of the present disclosure. In this embodiment, a co-packaged structure 1D is similar to the co-packaged structure 1C disclosed in FIG. 3, and a primary difference is that the co-packaged structure 1D further includes a vapor chamber 40 in thermal contact with the substrate 10. The optical module 20 and the vapor chamber 40 may be located at opposite sides of the substrate 10, respectively. More specifically, the vapor chamber 40 may be directly attached to a bottom surface of the substrate 10.

Figure 5:
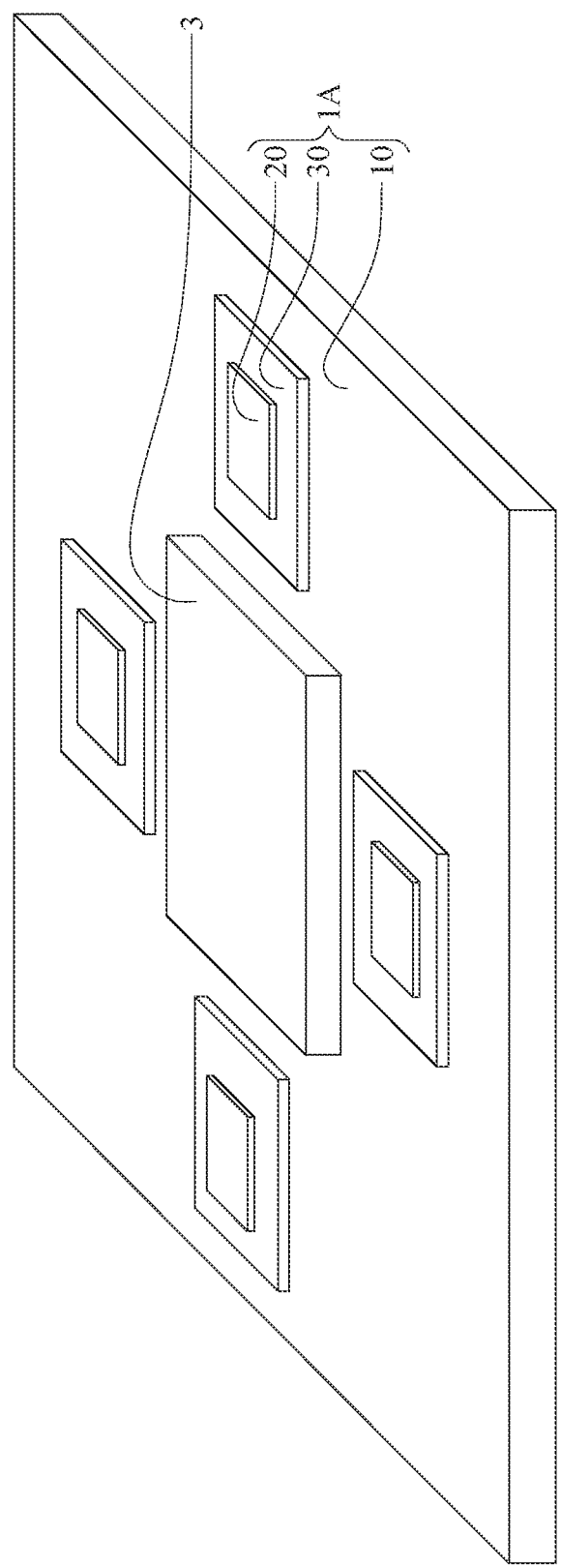
FIG. 5 is a schematic view showing an integration of the co-packaged structure in FIG. 1 with a chip for Ethernet switch.

FIG. 5 is a schematic view showing an integration of the co-packaged structure in FIG. 1 with a chip for Ethernet switch. The substrate 10 of the co-packaged structure 1A may also serve as a circuit board in an Ethernet switch. A chip for the Ethernet switch is, for example but not limited to, an ASIC 3 with a switching capacity of 51.2 Tbps or more which is electrically connected to the optical module 20 through the substrate 10.

According to the present disclosure, the substrate of the co-packaged structure is made of glass material so as to facilitate transmission loss reduction. The glass substrate enjoys the characteristics of chemical corrosion resistance, scratch resistance and low thermal deformation which can effectively protect the optical fibers.

Moreover, compared to the conventional CPO that forms a hollow in the circuit board and mount fiber arrays in this hollow, the formation of the fiber accommodation through holes in the substrate can prevent difference in thermal expansion due to different materials, such that the thermally expanded substrate will not overly squeeze or even bend the optical fibers, and thus it is helpful to maintain high optical coupling efficiency even after a long operation of the optical module. Furthermore, the formation of the fiber accommodation through holes in the substrate also eliminates the requirement of soldering process for bonding the fiber arrays to the circuit board in the conventional CPO, thereby helpful to simplify the manufacturing process.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A co-packaged structure for optics and electrics, including:
    a substrate;
    an optical module comprising a carrier and an optical transceiver unit, wherein the carrier is mounted on the substrate, and the optical transceiver unit is mounted on the carrier; and
    an electrical connection layer mounted on the substrate, wherein the carrier is electrically connected with a circuitry on the substrate through the electrical connection layer;
    wherein a plurality of fiber accommodation through holes corresponding to the optical transceiver unit are formed in the substrate;
    wherein the substrate comprises alkali-free glass, and a thermal expansion coefficient of the substrate is from 3 ppm/° C. to 10 ppm/° C.

2. The co-packaged structure for optics and electrics according to claim 1, wherein the optical transceiver unit is provided between the carrier and the plurality of fiber accommodation through holes.

3. The co-packaged structure for optics and electrics according to claim 1, wherein at least part of the electrical connection layer is provided between the substrate and the carrier.

4. The co-packaged structure for optics and electrics according to claim 1, wherein the optical transceiver unit comprises an optical transmitter engine and an optical receiver engine corresponding to the plurality of fiber accommodation through holes.

5. The co-packaged structure for optics and electrics according to claim 1, wherein a thickness of the substrate is from 50 μm to 300 μm, and a diameter of each of the plurality of fiber accommodation through holes is from 80 μm to 100 μm.

6. The co-packaged structure for optics and electrics according to claim 1, further comprising a vapor chamber in thermal contact with the substrate.

7. The co-packaged structure for optics and electrics according to claim 6, wherein the optical module and the vapor chamber are provided at opposite sides of the substrate, respectively.

8. The co-packaged structure for optics and electrics according to claim 1, wherein the plurality of fiber accommodation through holes are formed by removing part of the substrate.

9. A co-packaged structure for optics and electrics, including:
    a substrate;
    an optical module comprising a carrier and an optical transceiver unit, wherein the carrier is mounted on the substrate, and the optical transceiver unit is mounted on the carrier; and
    an electrical connection layer mounted on the substrate, wherein the carrier is electrically connected with a circuitry on the substrate through the electrical connection layer;
    wherein the substrate comprises alkali-free glass, and a thermal expansion coefficient of the substrate is from 3 ppm/° C. to 10 ppm/° C.

10. The co-packaged structure for optics and electrics according to claim 9, wherein the optical transceiver unit is provided between the carrier and the substrate.

11. The co-packaged structure for optics and electrics according to claim 9, wherein at least part of the electrical connection layer is provided between the substrate and the carrier.

12. The co-packaged structure for optics and electrics according to claim 9, further comprising a plurality of optical fibers, wherein the substrate comprises a light transmittable portion corresponding to the optical module, and the plurality of optical fibers are disposed corresponding to the light transmittable portion.

13. The co-packaged structure for optics and electrics according to claim 12, wherein the plurality of optical fibers are configured to transmit laser light.

* * * * *